July 23, 1940.  R. F. HAGGERTY  2,208,579
TRUSS
Filed Nov. 16, 1939
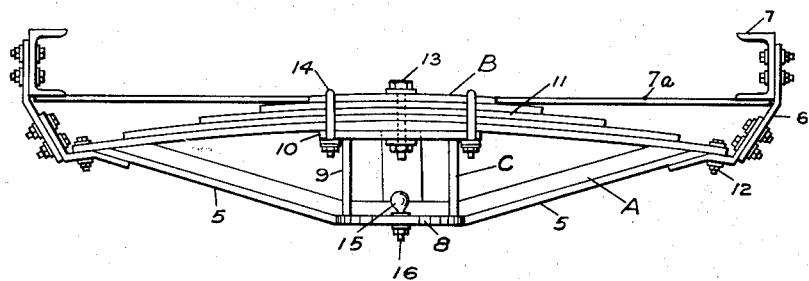
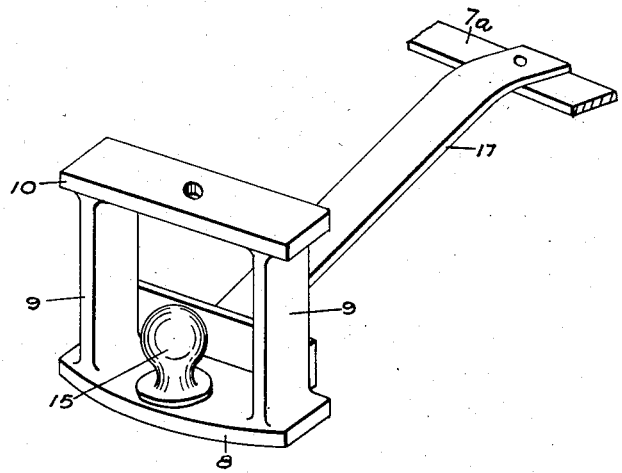
Inventor
R. F. Haggerty
By: Kessenich & Church
Attorneys Patented July 23, 1940

2,208,579

UNITED STATES PATENT OFFICE 2,208,579

TRUSS

Robert F. Haggerty, Square Butte, Mont.

Application November 16, 1939, Serial No. 304,727

4 Claims. (Cl. 280—106)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a truss which is particularly applicable for employment as a suspension for the load of a trailed vehicle.

The purpose of the invention is to provide a truss of great strength and light weight which is characterized by the employment of a spring as a compression member to provide an internally stressed suspension.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a view in elevation of a truss constructed in accordance with the invention and employed as a suspension;

Fig. 2 is a perspective view of the king post.

Referring to the drawing by characters of reference there is shown a truss comprising a tension member A, a compression member B, and a strut in the form of a king post C.

The tension member comprises a pair of rigid, relatively inclined arms 5—5 of T-section having their lower adjacent ends secured as by welding to the king post and having their outer and upper ends secured as by welding to supports which are in the form of stirrups 6—6 each fixed in the present instance to a side rail 7 of a vehicle chassis.

The king post C comprises a frame consisting of a bottom plate 8, side plates 9—9 and a top plate 10.

The compression member consists of a semi-elliptic spring 11 whose ends engage the ends of the arm 5—5 and rest on the stirrups adjacent the point of support of the arms 5 and are attached thereto by bolts 12 only after the spring has been initially deflected to bring its center portion into engagement with the top plate 10 where it is secured by one or more bolts 13 and by clamps 14. The top plate 10 is above the plane of the outer ends of the arms 5—5 and this relation is so determined that a predetermined force is necessary to deflect the spring downwardly into engagement with the top plate.

The resulting upward pull on the king post may be employed to balance a downwardly applied load on the truss so that stresses in the arms 5—5 are neutralized and the entire load is carried by the spring. Where the load exceeds the internal stressing of the spring the arms 5—5 will be stressed.

When the truss is to be employed as a suspension for taking the load of a trailed vehicle a draw bar coupling member of a suitable type, such as the ball 15, is conveniently attached by means of a bolt 16 to the bottom plate 8. In this application of the truss a brace 17 is preferably employed for connecting it to the chassis frame to take care of the draw bar pull or the thrust in braking.

The adaptation of a truss of this character to bolsters, axles, and other supports will be readily apparent. When the application is for a purpose not involving supports the ends of the compression and tension members are secured to one another.

I claim:

1. In a vehicle including supports, a suspension extending transversely of the vehicle and comprising a tension member having inclined arms with upper ends fixed to the supports, a king post fixed to the center of the tension member and having an upper surface above the plane of attachment of the tension member to the supports, a spring deflected under a predetermined force into engagement with the king post, means for attaching the spring to the king post, means for attaching the ends of the spring to the supports adjacent the tension member, a brace connecting the vehicle supports to the center portion of the suspension, and a draw bar coupling member on an element of the suspension.

2. In a vehicle including supports, a suspension extending transversely of the vehicle and comprising a tension member having inclined arms with upper ends fixed to the supports, a king post fixed to the center of the tension member and having an upper surface above the plane of attachment of the tension member to the supports, a spring deflected under a predetermined force into engagement with the king post, means for attaching the spring to the king post, means for attaching the ends of the spring to the supports adjacent the tension member.

3. A truss suspension comprising a frame serving as a king post, a pair of relatively inclined tension arms having their inner ends fixed to the frame and having their upper ends below the upper surface of the frame, a spring deflected under a predetermined force with its center brought into engagement with the upper surface of the frame, means for attaching the spring to the frame, means for rigidly coupling the ends of the spring and the ends of the arms.

4. In a truss suspension, a rigid tension member, a king post fixed to the center of the tension member, a compression member comprising a spring deflected into engagement with the king post and secured thereto, and means for rigidly coupling the ends of the spring and the ends of the tension member.

ROBERT F. HAGGERTY.